UNITED STATES PATENT OFFICE.

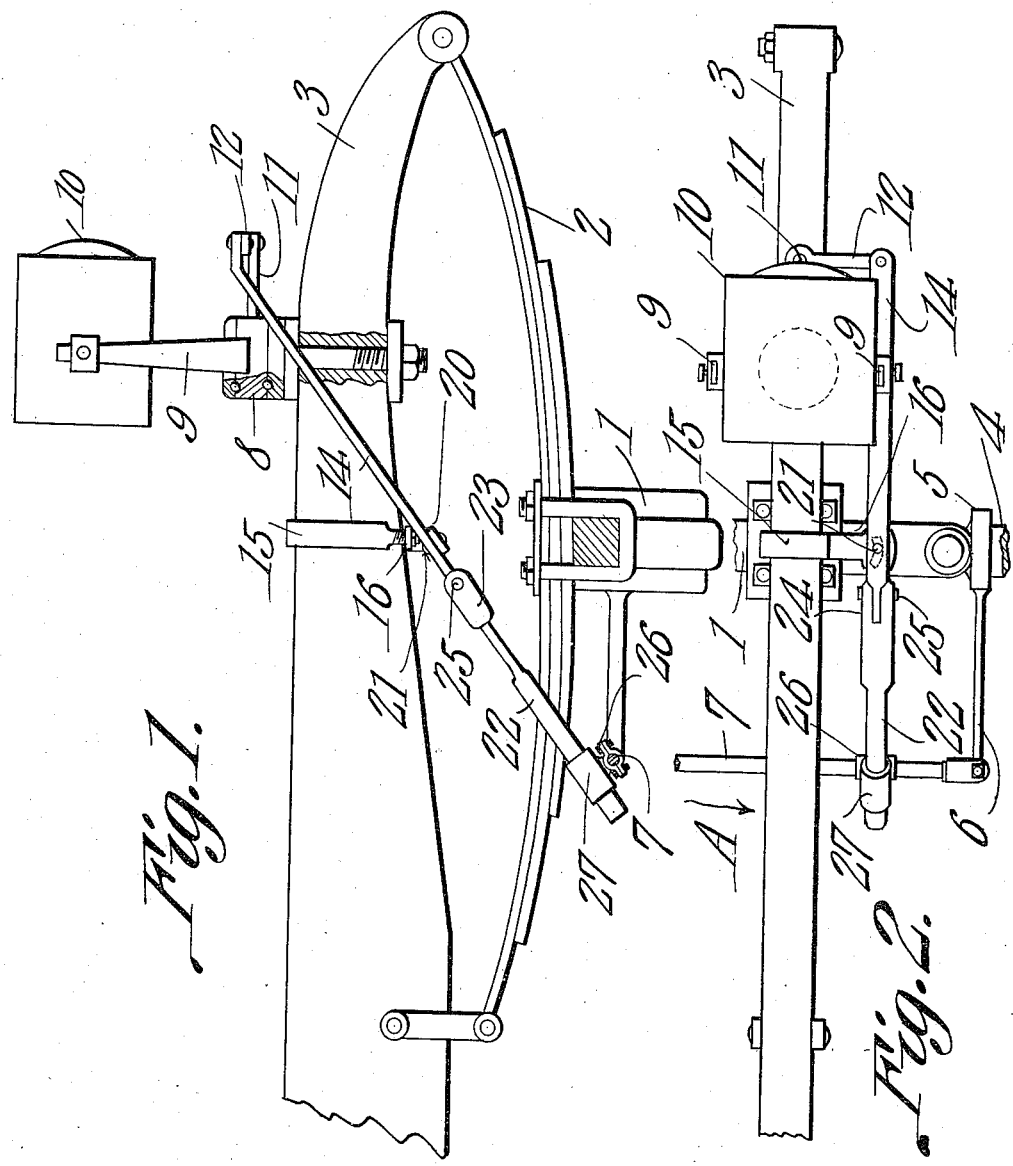

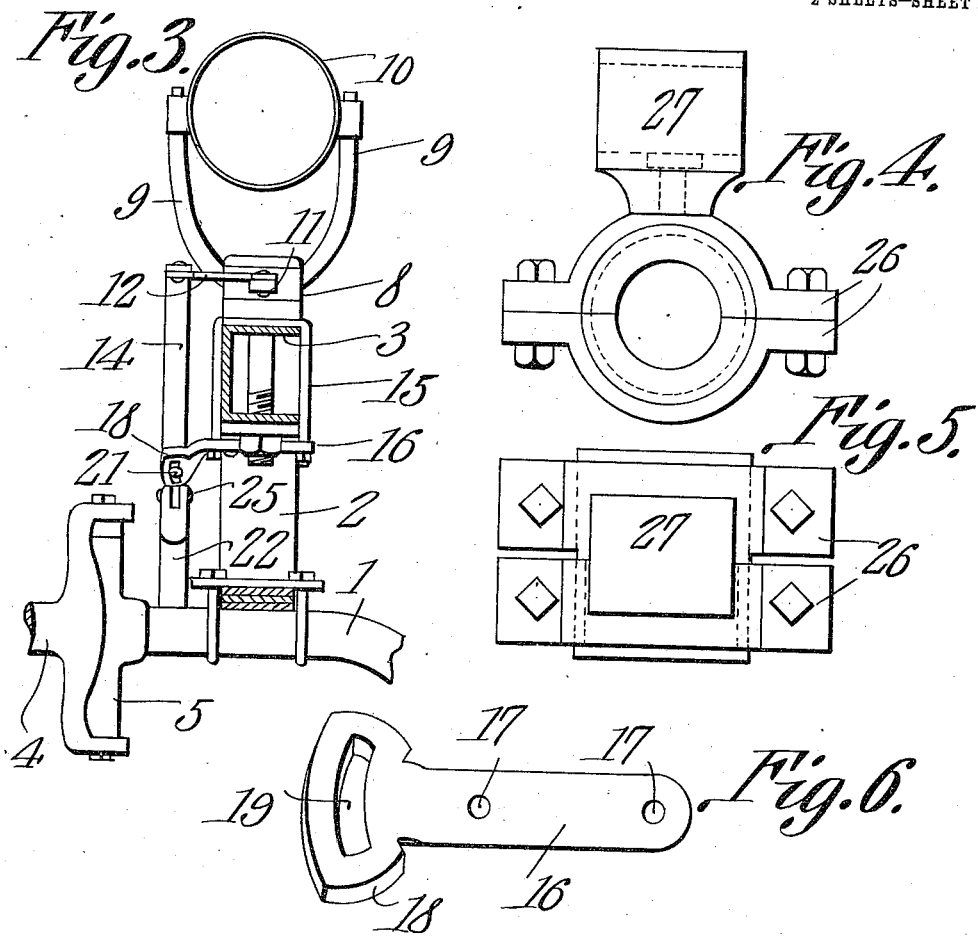

ROBERT A. BELL AND JAMES B. McKIEL, OF MARSHALL, TEXAS, ASSIGNORS OF ONE-FOURTH TO JAMES FINK AND ONE-FOURTH TO HARRY E. REINHEIMER, BOTH OF MARSHALL, TEXAS.

HEADLIGHT.

996,745.          Specification of Letters Patent.          Patented July 4, 1911.

Application filed February 26, 1910. Serial No. 546,080.

*To all whom it may concern:*

Be it known that we, ROBERT A. BELL and JAMES B. McKIEL, citizens of the United States, residing at Marshall, in the county of Harrison and State of Texas, have invented a new and useful Headlight, of which the following is a specification.

It is the object of this invention to provide a means whereby the lamps which are commonly carried by an automobile, may be turned pivotally from side to side, as the forward wheels of the automobiles are turned.

Another object of the invention is to provide a connection between a vehicle-carried lamp and a means for operating the same, the connection being so constructed that the movement of the body of the vehicle upon the springs thereof, will be ineffective to turn the lamp, or to shake the same in its mounting.

With the above and other objects in view, the invention consists in the novel construction and arrangement of parts hereinafter described, delineated in the drawings, and specifically pointed out in that portion of this instrument wherein patentable novelty is claimed, it being understood, that, within the scope of what is claimed, divers changes in the form, proportions, size, and minor details of the structure may be made, without departing from the spirit of the invention or sacrificing any of the advantages thereof.

Similar numerals of reference are employed to denote corresponding parts throughout the several figures of the drawings.

In the accompanying drawings,—Figure 1 shows the invention in side elevation; Fig. 2 is a top plan; Fig. 3 is a front elevation; Fig. 4 is a side elevation of the collar, showing the means whereby the collar is mounted in position; Fig. 5 is a top plan of the portion of the device depicted in Fig. 4; Fig. 6 is a detail perspective of a portion of the bracket which constitutes a fulcrum for one of the operating parts of the device; Fig. 7 is a sectional elevation showing a modified means for mounting one end of the mechanism whereby the lamp is turned; and Fig. 8 is a rear elevation of that portion of the device which is depicted in Fig. 7.

At present, automobiles and like vehicles, are commonly equipped with lamps, disposed upon opposite sides of the vehicle. This invention contemplates the provision of a mechanism whereby both of the said lamps may be manipulated; but, since the said mechanism consists of two duplicate structures, one of which is adapted to operate a single lamp, but one side of the vehicle is shown, and but one of the mechanisms whereby the lamps are manipulated, will likewise be shown and described.

In the drawings, the forward axle of the vehicle is denoted generally by the numeral 1. Secured to this axle 1 in any desired manner, is a spring 2, to the ends of which the chassis 3 is secured. The axle 1 is provided with the usual movable end portion 4, carrying the wheel of the vehicle, this movable end portion 4 being connected with the axle 1 proper, by means of knuckle joint 5, of any desired construction.

In order to manipulate the movable end 4 of the axle 1, the knuckle 5 is provided with an extension 6 which protrudes sometimes, forwardly, and sometimes, rearwardly, the latter arrangement being, for the sake of illustration, delineated in the present instance. Connected with this extension 6 is a rod 7, disposed transversely of the vehicle frame, and constituting a means for shifting the movable end 4 of the axle, the term "vehicle frame" being employed to denote generally, the chassis 3, the spring 2, and the other fixed portions upon which the vehicle body is commonly supported.

Mounted in any suitable manner upon the chassis 3, adjacent the forward end thereof, is a ball bearing head 8, provided with spaced standards 9, adapted to receive and to uphold the lamp 10. From the forward face of this head 8, there outstands an arm 11, connected by means of a link 12, with the forward end of a lever 14, the same slanting downwardly toward the rear of the vehicle. This lever 14 is pivotally supported upon the chassis 3, intermediate its ends, by means of a bracket. This bracket may comprise a U bolt 15, arranged to embrace the chassis 3, and a plate 16, which is seen to best advantage in Fig. 6. This plate 16 is provided with spaced openings 17, adapted to receive the arms of the U bolt; and at one of the plates 16, there is a transversely disposed head 18, provided with a longitudinally extended slot 19, the head being, as denoted by the numeral 20 in Fig. 1, commonly inclined downwardly and rearwardly when it is mounted in place upon the vehicle. This slot 19 is adapted to receive a pivot bolt 21 which constitutes the immediate fulcrum for the lever 14. The bracket, as thus described, is adapted to be used when the invention is to be applied to a vehicle which is in use.

It is of course to be understood that when the invention is applied to a vehicle during the process of manufacture of the same, another means than that shown, for applying the plate 16 to the chassis 3 may be employed to advantage, depending upon the construction of the vehicle and the practice in the shop where the work is being carried forward. The invention further includes a rod 22, provided at its forward end with a head 23, the head being bifurcated as denoted by the numeral 24, to receive the rear end of the lever 14. A pivot bolt 25 unites the rear end of the lever 14 with the bifurcations 24 of the rod 22, and the construction is such that a hinge joint is effected, whereby the rod 22 may have pivotal movement with respect to the lever 14, in a plane at right angles to the plane of movement of the lever.

Clamps 26 are secured about the rod 7, and to the upper of these clamps, a collar 27 is pivotally fastened the pivotal mounting between the collar 27 and the upper of the clamps 26 being effected by any convenient and desired means; the showing of Fig. 4 illustrating the pivotal mounting of the collar 27 sufficiently, without detail description. As seen most clearly in Fig. 2, there is an opening in this collar 27, in which the rear end of the rod 22 is adapted to reciprocate longitudinally, transversely of the rod 7.

In practical operation, when the rod 7 is shifted in the direction of the arrow A of Fig. 2, the collar 27 will be carried toward the outer side of the vehicle, the lever 14 fulcruming upon the element 21, the forward end of the lever 14 moving inwardly toward the center of the vehicle, and, through the medium of the link 12, causing the lamp 10 to rotate. Obviously, as the vehicle moves over the road, the spring 2 will yield to a considerable extent, and, in order to prevent the lamp 10 from being shaken and turned from side to side by this reciprocation of the vehicle upon its springs, the rear end of the rod 22 is left free to reciprocate within the collar 27; moreover, owing to the hinged union between the parts 14 and 22, effected by means of the pivot bolt 25, the member 22 will be hingedly connected with the lever 14 for movement in a plane substantially at right angles to the plane of movement of the lever 14; this construction further tending to prevent the lamp 10 from being jarred or turned about when the vehicle body moves upon the spring 2. The pivotal connection between the collar 27 and the upper of the clamps 26 further tends to obviate the possibility of the lamp 10 being swung about or jarred through the compression of the vehicle springs.

It is of course obvious that the construction hereinbefore pointed out, need not be adhered to rigidly. To illustrate one of the many changes which may be made without departing from the spirit of the invention, the clamps 26 of Fig. 4 may be replaced by the clamps 28 and 29 of Figs. 7 and 8, the clamp 29 carrying the upright pivot pin 30, upon which is mounted for rotation, a collar composed of a fork 31, the upper extremities of which are connected by means of a cross bolt 32. The rod 22 in such case, may be replaced by the rod 33 of Fig. 7, the same being adapted to reciprocate between the upright arms of the fork 31. Secured at one end to the rod 33, longitudinally of the same, is a spring plate 34, the rear end of which bears against the cross bolt 32 to prevent the end of the rod 33 from moving about within the fork. As seen in Fig. 7, the bottom of the fork 31 may be rounded, as denoted by the numeral 35, in order that the rod 33 may have free and proper movement in a vertical plane, within the fork.

Having thus described the invention what is claimed is:—

1. In a device of the class described, a vehicle frame having a movable axle end; means for shifting the axle end; a lamp pivotally supported upon the frame; and a connection between the shifting means and the lamp, for turning the lamp; the connection being arranged to reciprocate longitudinally upon and transversely of said shifting means.

2. In a device of the class described, a vehicle frame having a movable axle end; means for shifting the axle end; a lamp pivotally supported upon the frame; and a connection between the shifting means and the lamp, for turning the lamp; the connection being pivotally united with the shifting means and arranged to reciprocate longitudinally upon and transversely of said shifting means.

3. In a device of the class described, a vehicle frame having a movable axle end; a rod disposed transversely of the frame and operatively connected with the axle end to shift the same; a lamp pivotally supported upon the frame; a collar pivotally connected with the rod; and a connection arranged to reciprocate in the collar and operatively connected with the lamp to turn the same.

4. In a device of the class described, a vehicle frame having a movable axle end; means for shifting the axle end; a lamp pivotally supported upon the frame; a lever pivotally connected intermediate its ends with the frame and operatively connected at one end with the lamp; a rod hinged to the other end of the lever for movement at right angles to the plane of movement of the lever; and means for operatively connecting the rod with the shifting means, to turn the lamp.

5. In a device of the class described, a vehicle frame having a movable axle end; means for shifting the axle end; a lamp pivotally supported upon the frame; a lever pivotally connected intermediate its ends with the frame and operatively connected at one end with the lamp; a rod hinged to the other end of the lever for movement at right angles to the plane of movement of the lever; and means for slidably connecting the rod with the shifting means, to turn the lamp.

6. In a device of the class described, a vehicle frame having a movable axle end; means for shifting the axle end; a lamp pivotally supported upon the frame; a lever pivotally connected intermediate its ends with the frame and operatively connected at one end with the lamp; a rod hinged to the other end of the lever for movement at right angles to the plane of movement of the lever; and means for connecting the rod with the shifting means, for both reciprocatory and pivotal movement.

7. In a device of the class described, a vehicle axle having a movable end; means for shifting the movable axle end; a spring secured to the axle; a chassis secured to the spring; a lamp pivotally carried by the chassis; a lever pivoted at one end to the lamp, an adjustable fulcrum for the lever carried by the chassis; and means for operatively connecting the lever with the shifting means, to turn the lamp.

8. In a device of the class described, a vehicle axle having a movable end; means for shifting the movable end; a spring secured to the axle; a chassis secured to the spring; a lamp pivotally carried by the chassis; a lever pivoted at one end to the lamp; an adjustable fulcrum for the lever carried by the chassis; a rod hinged to the lever for movement at right angles to the plane of movement of the lever; and means for operatively connecting the rod with the shifting means, to turn the lamp.

9. In a device of the class described, a vehicle axle having a movable end; means for shifting the movable axle end; a spring secured to the axle; a chassis secured to the spring; a lamp pivotally carried by the chassis; a lever pivotally connected at one end with the lamp, an adjustable fulcrum for the lever carried by the chassis; a rod hinged to the lever for movement at right angles to the plane of movement of the lever; and means for pivotally connecting the rod with the shifting means.

10. In a device of the class described, a vehicle axle having a movable end; means for shifting the movable axle end; a spring secured to the axle; a chassis secured to the spring; a lamp pivotally carried by the chassis; a lever pivoted at one end to the lamp; an adjustable fulcrum for the lever carried by the chassis; a rod hinged to the lever for movement at right angles to the plane of movement of the lever; and means for connecting the rod with the shifting means, for both reciprocatory and pivotal movement.

11. In a device of the class described, a vehicle frame including an axle having a movable end; a rod disposed transversely of the frame and operatively connected with the axle end to shift the same; a spring secured to the axle; a chassis secured to the spring; a lamp pivotally carried by the frame; a lever pivoted at one end to the lamp; an adjustable fulcrum for the lever carried by the chassis; a rod hinged to the lever for movement at right angles to the plane of movement of the lever; a collar pivotally connected with the first named rod; in which collar the last named rod is mounted for longitudinal reciprocation.

In testimony that we claim the foregoing as our own, we have hereto affixed our signatures in the presence of two witnesses.

ROBERT A. BELL.
JAMES B. McKIEL.

Witnesses:
M. C. McCAULEY,
D. K. BELL.